Figure 3:
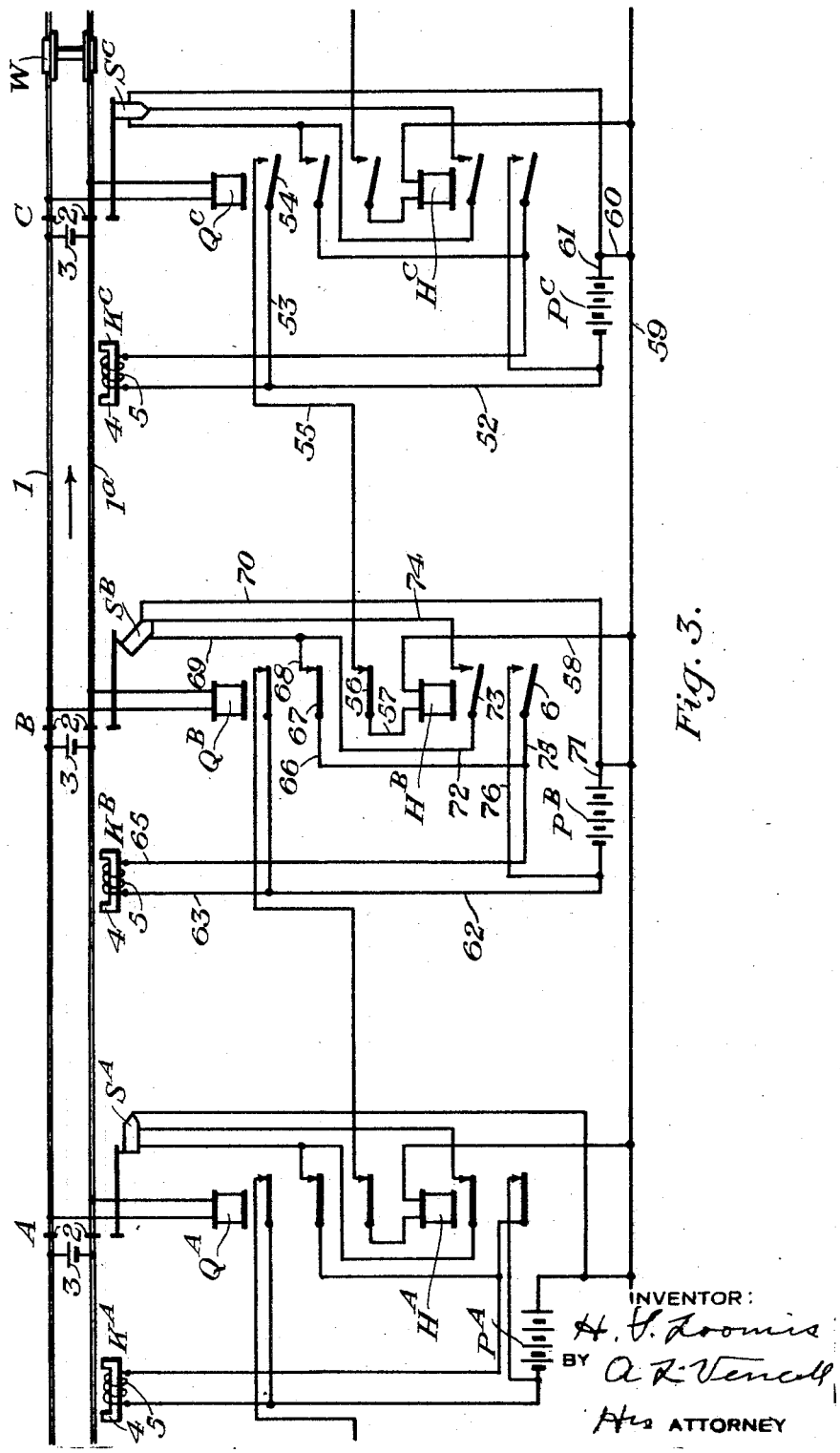

Sept. 8, 1931.    H. S. LOOMIS    1,822,497
RAILWAY TRAFFIC CONTROLLING APPARATUS
Filed Feb. 25, 1925    2 Sheets-Sheet 1
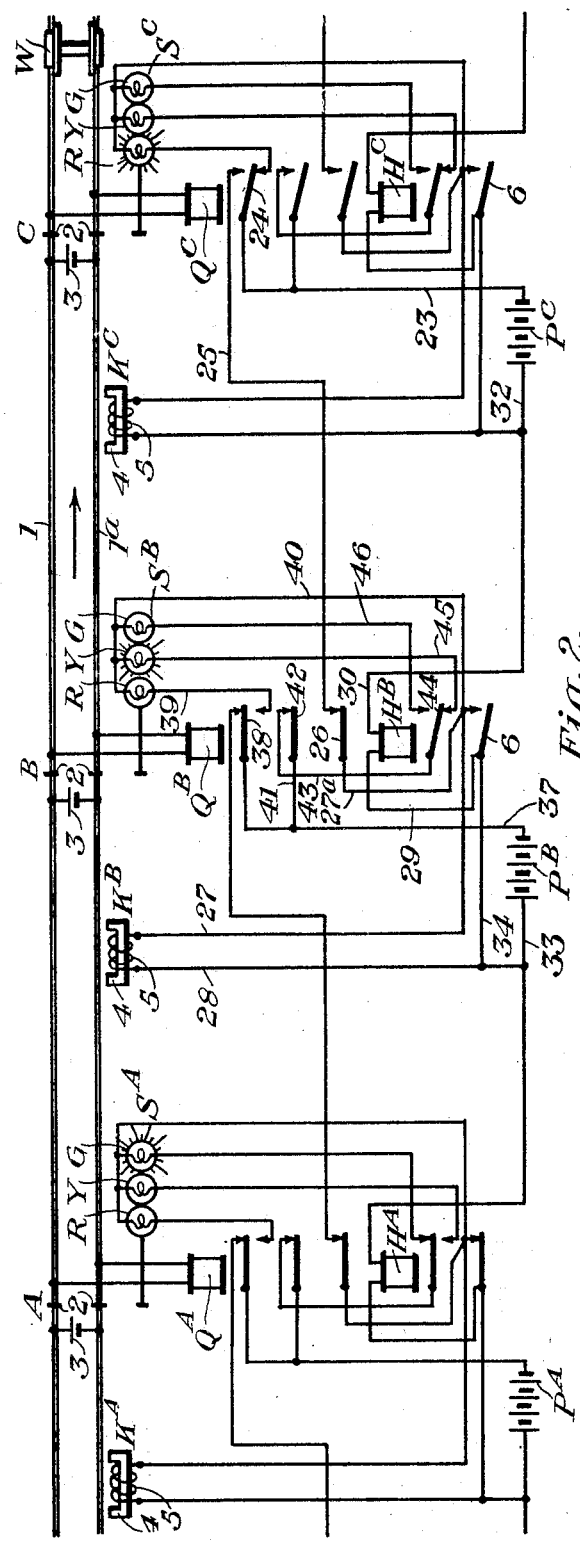
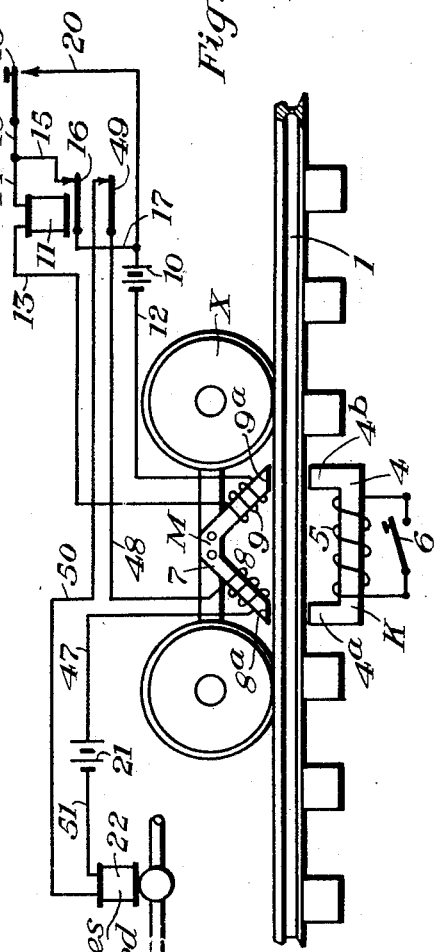
Fig.1.
Fig.2.
Applies Brakes when Deenergized
INVENTOR:
H. S. Loomis,
by A. F. Vencill
His ATTORNEY Sept. 8, 1931.  H. S. LOOMIS  1,822,497
RAILWAY TRAFFIC CONTROLLING APPARATUS
Filed Feb. 25, 1925  2 Sheets-Sheet 2

INVENTOR:
H. S. Loomis
BY
A. R. Vencel
His ATTORNEY

Patented Sept. 8, 1931

1,822,497

UNITED STATES PATENT OFFICE

HAROLD S. LOOMIS, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRAFFIC CONTROLLING APPARATUS

Application filed February 25, 1925. Serial No. 11,482.

My invention relates to railway traffic controlling apparatus, and particularly to apparatus of the type comprising train carried governing means adapted to cooperate with train controlling devices located in the trackway.

I will describe two forms of trackway apparatus embodying my invention, and one form of train carried apparatus suitable for use therewith, and will then point out the novel features thereof in claims.

In the accompanying drawings, Fig. 1 is a view, partly diagrammatic, showing one form of train carried governing apparatus. Fig. 2 is a diagrammatic view showing one form of trackway apparatus suitable for co-operation with the train carried apparatus of Fig. 1 and embodying my invention. Fig. 3 is a view showing a modification of the trackway apparatus illustrated in Fig. 2, and also embodying my invention.

Similar reference characters refer to similar parts in each of the three views.

Referring first to Fig. 1, the reference character X designates a railway train. Carried by the train is an inductor M comprising a core 7 of inverted U-shape. This core is made of magnetizable material, and its two downwardly projecting legs $8^a$ and $9^a$ are provided with windings 8 and 9, respectively. The train is also provided with a relay 11, a battery 10, and a normally open manually operable circuit controller 19.

When circuit controller 19 is closed, current flows from battery 10, through wire 20, circuit controller 19, wires 18 and 14, winding of relay 11, wire 13, winding 9, and wire 12 to battery 10. Relay 11 then becomes energized, closing its front contact and completing a stick circuit from battery 10, through wire 17, front contact 16 of relay 11, wires 15 and 14, winding of relay 11, wire 13, winding 9, and wire 12 to battery 10. It is plain therefore that having once been energized by operation of circuit controller 19, the relay will remain in its energized condition by virtue of its stick circuit, after the circuit controller is opened.

The train is further provided with a second battery 21, and an electro-responsive device 22 arranged to apply the brakes when de-energized. When relay 11 is energized, current flows from battery 21, through wire 47, winding 8, wire 48, front contact 49 of relay 11, wire 50, device 22, and wire 51, to battery 21. It follows that when relay 11 is energized current flows through both windings 8 and 9, and these windings are so arranged that the magnetic flux created in core 7 by winding 8 opposes the flux created in the core by winding 9. Ordinarily, however, the magnetic path traversed by these fluxes contains a large air gap between the legs $8^a$ and $9^a$ of core 7. Under this condition the flux caused by one winding has substantially no effect upon the current in the other.

Located in the trackway are a plurality of trackway train controlling devices such as inductors of which only one, K, is shown in Fig. 1. Each of these inductors comprises a U-shaped magnetic core 4 having upstanding legs $4^a$ and $4^b$ so disposed that when the train X passes the inductor K, the core 4 bridges the air gap between the legs $8^a$ and $9^a$ of core 7. Core 4 is provided with a winding 5 which is at times close circuited through a circuit controller 6 controlled by any suitable means not shown in the drawings. If circuit controller 6 is closed when the train carried inductor 7 passes over the trackway inductor K, the effective reluctance of core 4 is so great that the change in the total reluctance of the magnetic circuit traversed by the fluxes from windings 8 and 9 is practically negligible and the train carried apparatus is not affected.

I will assume however, that the train carried apparatus is in the condition illustrated in the drawings, that is, that relay 11 and device 22 are both energized, and that circuit controller 6 is open. I will also assume that the train carried inductor M passes over the trackway inductor K, so that core 4 bridges the air gap between the legs of core 7. Since the winding 5 is not close circuited, the reluctance of the magnetic path for the fluxes created by windings 8 and 9 is materially reduced. The flux from winding 8 linking winding 9, is therefore increased, and an electromotive force is induced in winding 9 by this increase of flux. This induced electromotive force creates a current in the circuit of relay 11 which opposes the current from battery 10 so that the current in relay 11 is reduced to substantially zero or is reversed. Relay 11 therefore becomes de-energized and opens its front contact. Device 22 is thereby de-energized, and the brakes are applied. When the train has moved past inductor K, relay 11 remains in its de-energized condition, its stick circuit being open at its own front contact 16, until the parts are restored to their normal condition by operation of circuit controller 19.

It is plain from the foregoing that if the winding 5 of trackway inductor K is close circuited, a train passing the inductor will not be affected, but if a train passes inductor K with winding 5 open circuited the brakes on the train will be applied and can subsequently be released only by deliberate action on the part of the engineer who must operate circuit controller 19.

Considering now the control of the trackway inductors, and referring first to Fig. 2, the reference characters 1 and 1$^a$ designate the track rails of a stretch of railway track over which traffic normally moves in the direction indicated by the arrow. These track rails are divided, by means of insulated joints 2, into a plurality of successive track sections A—B, B—C, etc. Each such track section is provided with a source of track circuit current, here shown as a track battery 3, connected across the rails adjacent the exit end of the section. Each section is also provided with a track relay designated by the reference character Q with an exponent corresponding to the location and connected across the rails adjacent the entrance end of the section. Associated with each track relay Q is a line relay designated by the reference character H with a suitable exponent.

Each track section is also provided with a trackway signal designated by the reference character S with an exponent corresponding to the location. As here shown each signal S is located adjacent the entrance end of the associated section, and each comprises three lamps R, Y and G, adapted when lighted to indicate "stop", "caution" and "proceed", respectively, but it should be understood that this particular form and location of the signals is not essential.

I further provide each track section with a trackway inductor device designated by the reference character K with an appropriate exponent. Each such inductor K is similar to the trackway inductor K described in connection with Fig. 1 and is suitable for cooperation with train carried apparatus such as shown in Fig. 1. Preferably, the trackway inductor for each section is located in rear of the entrance end of the associated section by a distance equal to the distance required to bring a train of the heaviest class using the stretch, from the highest permissive speed to a full stop.

The winding 5 of each inductor K is arranged to be close circuited when the associated line relay is energized. For example, inductor $K^B$ is provided with a shunting circuit which may be traced from one terminal of winding 5 of the inductor, through wire 27, front contact 6 of relay $H^B$, and wires 34 and 28, to the other terminal of winding 5. Obviously, therefore, if relay $H^B$ is energized, inductor $K^B$ will have no effect upon a train approaching point B, but if relay $H^B$ is de-energized, the brakes will be applied on a train passing inductor $K^B$.

Since the operation of the system depends so materially upon the shunting circuits for the trackway inductors, I provide in my invention means for checking the circuit for each inductor. In Fig. 2 I accomplish this result by including substantially all of the shunting circuit for each trackway inductor in the closing circuit for the associated line relay.

For example, the circuit for relay $H^B$ passes from a battery $P^C$ located at point C, through wire 23, front contact 24 of relay $Q^C$, wire 25, front contact 26 of relay $Q^B$, wires 27$^a$ and 27, winding 5 of inductor $K^B$, wires 28, 34 and 29, winding of relay $H^B$, and wires 30 and 32, to battery $P^C$. This circuit is closed only when relays $Q^C$ and $Q^B$ are both energized. It should also be pointed out that a break in the winding of inductor $K^B$ or in the shunting circuit therefor will prevent relay $H^B$ from becoming closed. After this relay becomes closed, its contact 6 constitutes a shunt around winding 5 in the circuit just traced.

Each signal S is controlled by the associated track relay Q and line relay H. Referring, for instance, to signal $S^B$, when relay $Q^B$ is de-energized, current flows from battery $P^B$, through wire 37, back contact 38 of relay $Q^B$, wire 39, lamp R of signal $S^B$, wires 40 and 27, winding 5 of inductor $K^B$, and wires 28 and 33 back to battery $P^B$. When this circuit is closed lamp R of signal $S^B$ is lighted, and the signal displays a stop signal. Another circuit may be traced from battery $P^B$, through wires 37 and 41, front contact 42 of relay $Q^B$, wire 43, back contact 44 of relay $H^B$, wire 45, lamp Y of signal $S^B$, wires 40 and 27, winding 5 of inductor $K^B$, and wires 28 and 33 to battery $P^B$. This circuit is closed only when relay $Q^B$ is energized and relay $H^B$ is de-energized, under which conditions lamp Y is lighted and signal $S^B$ indicates caution. If relays $Q^B$ and $H^B$ are both energized, current flows from battery $P^B$, through wires 37 and 41, front contact 42 of relay $Q^B$, wire 43, front contact 44 of relay $H^B$, wire 46, lamp G of signal $S^B$, wires 40 and 27, winding 5 of inductor $K^B$, and wires 28 and 33, back to battery P$^B$. When this circuit is closed lamp G is lighted and signal S$^B$ displays a proceed signal. In this proceed circuit the inductor winding 5 is of course shunted by the low resistance path passing from wire 40 through contact 6 and wire 34 to wire 28.

It will be seen from the foregoing that each of the signal circuits, including, respectively, lamps R and Y, includes also winding 5 of inductor K$^B$ and substantially all of the shunting circuit associated therewith. It follows that a break in any part of this circuit or in the winding itself will make it impossible for either of the lamps R or Y in signal S$^B$ to become lighted. The resistances of these circuits are so high, however, due to the lamps, that so far as the train carried apparatus is concerned they are in effect open circuits. That is, if the contact 6 is open, the associated inductor K will give a stop indication even though a circuit is closed through winding 5 and the caution or the stop lamp Y or R.

Each of the remaining signals S is controlled by the associated relays Q and H in the same manner as just explained for the control of signal S$^B$ by relays Q$^B$ and H$^B$.

As shown in the drawings, the section to the right of point C is occupied by a train indicated diagrammatically at W. Relay Q$^C$ is therefore de-energized, as also is relay H$^C$. The shunt circuit for inductor K$^C$ is open at front contact 6 of relay H$^C$. Relay Q$^B$ is energized, but relay H$^B$ is de-energized, its circuit being open at front contact 24 of relay Q$^C$. The shunt circuit for inductor K$^B$ is therefore open at front contact 6 of relay H$^B$. Relay Q$^A$ is energized, and relay H$^A$ is also energized, and winding 5 of inductor K$^A$ is therefore close circuited.

I will now assume that a train provided with train carried apparatus similar to that shown in Fig. 1, proceeds through the stretch of track shown in the drawings.

As this train passes inductor K$^A$, the train carried apparatus will not be affected because inductor K$^A$, due to its close circuited winding 5, will not appreciably change the reluctance of the magnetic circuit through windings 8 and 9 on the train. When the train passes inductor K$^B$, however, relay 11 on the train becomes de-energized, as explained hereinbefore, and device 22 is de-energized to apply the brakes on the train. The brakes can subsequently be released if the engineman manipulates circuit controller 19. When the train passes inductor K$^C$ the brakes are again applied and must be again manually released.

I will now assume that a break occurs in the winding 5 of inductor K$^B$ or in wire 27 or 28 leading to this inductor. If relays Q$^B$ and H$^B$ are both energized at the time, no change occurs in signal S$^B$ because relay H$^B$ remains closed through its contact 6 and the circuit for proceed lamp G is closed through this same contact. The next train passing inductor K$^B$ will receive a stop indication, however, and the fact that such indication is received when signal S$^B$ is at proceed will give the engineer evidence that an abnormal condition exists. When such train enters section B—C, opening relays Q$^B$ and H$^B$, signal S$^B$, instead of indicating stop as it should, will be unlighted because the circuit for its stop lamp R will be open at the break in winding 5 or its associated wires. When the train leaves section B—C, relay Q$^B$ will close, but signal S$^B$ will still be unlighted because the circuit for its caution lamp Y is open at the break in winding 5 or its associated wires. When the train leaves the section to the right of point C, relay H$^B$ will remain open because its closing circuit is open at the assumed break, and so all lamps of signal S$^B$ will remain unlighted. The next train to approach signal S$^B$ will, therefore, receive evidence of an abnormal condition because all lights of this signal are extinguished, and this is true regardless of how far the first train has proceeded past the signal.

Referring now to Fig. 3, in the trackway apparatus here shown, each track section is provided, as in Fig. 2, with a track circuit including a track battery 3 and a track relay Q. Each section is also provided with a line relay H, a trackway inductor K, and a signal S.

In Fig. 3 each signal S is of the three position semaphore type capable of displaying a proceed, a caution, or a stop indication in the usual and well known manner.

Each line relay H is controlled by the associated track relay and by the track relay for the section next in advance. For example the circuit for relay H$^B$ may be traced from battery P$^C$, through wires 52 and 53, front contact 54 of relay Q$^C$, wire 55, front contact 56 of relay Q$^B$, wire 57, winding of relay H$^B$, and wires 58, 59, 60 and 61 to battery P$^C$. Relay H$^B$ is, therefore, energized only when relays Q$^B$ and Q$^C$ are both energized. The control of the remaining relays H is similar to the control of relay H$^B$.

When relay H$^B$ is energized a shunting path of low resistance is completed for inductor K$^B$, which path may be traced from the right hand terminal of winding 5 of inductor K$^B$, through wires 65 and 75, front contact 6 of relay H$^B$, and wires 76, 62 and 63, to the left hand terminal of winding 5 of inductor K$^B$. When this circuit is closed winding 5 of inductor K$^B$ is close circuited and a train passing the inductor will not incur an automatic application of the brakes.

When track relay Q$^B$ is de-energized, the operating circuits for signal S$^B$ are open and the signal indicates stop. If relay Q$^B$ is energized, current flows from battery P$^B$, through wires 62 and 63, winding 5 of inductor K$^B$, wires 65 and 66, front contact 67 of relay Q$^B$, wires 68 and 69, operating mechanism of signal S$^B$, and wires 70 and 71 to battery P$^B$, and the signal S$^B$ indicates caution. When relays Q$^B$ and H$^B$ are both energized a circuit may be traced from battery P$^B$, through wires 62 and 63, winding 5 of inductor K$^B$, wires 65 and 66, front contact 67 of relay Q$^B$, wires 68 and 72, front contact 73 of relay H$^B$, wire 74, operating mechanism of signal S$^B$, and wires 70 and 71 to battery P$^B$. When this circuit is closed, signal S$^B$ indicates proceed. The inductor winding 5 is shunted at this time by the path through wire 76, contact 6, and wire 75 to wire 65.

It should be particularly pointed out that the caution operating circuit for signal S$^B$ includes winding 5 of inductor K$^B$ and substantially all of the shunting circuit associated therewith. The purpose of this feature is to insure that the circuit for the inductor is in perfect condition when the signal is displaying a caution indication. The resistance of the caution circuit for each signal is so high, however, that it does not prevent the proper functioning of the associated inductor K.

As shown in the drawings the section to the right of point C is occupied by a train, so that relay Q$^C$ is deenergized. Relay H$^C$ is therefore de-energized, and the shunting circuit for inductor K$^C$ is open. Relay Q$^B$ is energized but relay H$^B$ is de-energized, its circuit being open at front contact 54 of relay Q$^C$. Inductor K$^B$ is therefore open circuited. Relays Q$^A$ and H$^A$ are both energized and inductor K$^A$ is close circuited. If a train provided with the governing apparatus illustrated in Fig. 1 moves through the stretch of track shown in the drawings the brake applying apparatus will be unaffected as the train passes inductor K$^A$, but the brakes will be applied on passing inductor K$^B$ and again on passing inductor K$^C$, the brakes being released manually after each such application, in the manner explained hereinbefore.

I will now assume that a break occurs in winding 5 of inductor K$^B$ or in wires 62, 63 or 65 leading to this inductor. If signal S$^B$ is in the proceed position at the time, no change occurs in the indication given by the signal because its proceed circuit remains closed through contact 6. The next train to pass inductor K$^B$, however, will receive a stop indication at such inductor, and the fact that such indication is received while signal S$^B$ is at proceed will give the engineer evidence that an abnormal condition exists. When this train enters section B—C, signal S$^B$ will of course go to the stop position, but when the train leaves section B—C so that track relay Q$^B$ closes, signal S$^B$ will remain at stop because its caution circuit is open at the assumed break.

In both forms of the trackway apparatus embodying my invention, the shunting circuits for the trackway inductors are included in circuits which control the trackway signals, either directly or indirectly, and the invention therefore provides a constant check upon the integrity of these shunting circuits.

Although I have herein shown and described only two forms of trackway apparatus embodying my invention, and one form of train carried apparatus suitable for cooperation therewith, it is understood that various changes and modifications may be made therein within the scope of the appended claims without departing from the spirit and scope of my invention.

Having thus described my invention, what I claim is:

1. In combination along a railway track, a trackway device comprising a core for magnetic co-operation with a train carried receiver which core is provided with a winding, a signal adapted to indicate proceed, caution and stop, and a caution indication circuit for said signal including the signal and said winding.

2. In combination along a railway track, a trackway device provided with a winding, a signal adapted to indicate proceed, caution and stop, a caution indication circuit and a proceed indication circuit for said signal each including said winding, and a low resistance shunt around said winding in said proceed indication circuit but not in said caution indication circuit.

3. In combination, a railway track, a track relay, a line relay, a trackway inductor including a winding, a circuit for said line relay including said winding and a contact on said track relay, a low resistance circuit for said winding including a contact on said line relay, and a trackway signal controlled by said line relay.

4. Railway traffic controlling apparatus comprising a trackway device having a core for magnetic co-operation with a train carried receiver which core is provided with a winding, a trackway signal, and a circuit including said signal and said winding.

5. Railway traffic controlling apparatus comprising a trackway inductor provided with a winding, a trackway signal, a track relay, a line relay controlled by said track relay, a caution indication circuit for said signal including said winding and a front contact of said track relay, a proceed indication circuit for said signal including front contacts of said track relay and said line relay, and a low resistance shunt around said winding in said proceed indication circuit and including a front contact of said line relay.

6. Railway traffic controlling apparatus comprising a trackway device including a winding, a first circuit for at times close circuiting said winding, a trackway signal, and a second circuit including operating mechanism for said signal and also including substantially all of said first circuit.

7. Railway traffic controlling apparatus comprising a trackway device including a winding, a track relay, a line relay controlled by said track relay, a first circuit of low resistance including said winding and a front contact on said line relay, a trackway signal; and a second circuit including operating mechanism for said signal, a front contact on said track relay, and substantially all of said first circuit.

8. Railway traffic controlling apparatus comprising a trackway device including a winding, a track relay, a line relay controlled by said track relay, a first circuit of low resistance including said winding and a front contact on said line relay, a trackway signal; a second circuit including operating mechanism for said signal, a front contact on said track relay, and substantially all of said first circuit; and a third circuit including a front contact on said track relay, a front contact on said line relay, operating mechanism for said signal, and substantially all of said first circuit.

In testimony whereof I affix my signature.

HAROLD S. LOOMIS.